US008395900B2

(12) United States Patent
Schrempp

(10) Patent No.: US 8,395,900 B2
(45) Date of Patent: Mar. 12, 2013

(54) POWER ROUTING DEVICE FOR EXPANSION SLOT OF COMPUTER SYSTEM

(75) Inventor: Michael W. Schrempp, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 214 days.

(21) Appl. No.: 12/797,483

(22) Filed: Jun. 9, 2010

(65) Prior Publication Data

US 2011/0304966 A1    Dec. 15, 2011

(51) Int. Cl.
*H05K 7/00* (2006.01)
(52) U.S. Cl. ............... 361/729; 361/807; 361/810
(58) Field of Classification Search ......... 361/728–730, 361/686, 735, 790, 807, 809, 810; 345/163, 345/168; 709/204, 246; 710/100, 300, 301
See application file for complete search history.

(56) References Cited

U.S. PATENT DOCUMENTS

| 5,656,869 | A | * | 8/1997 | Gluskoter et al. ............... 307/64 |
| 7,075,796 | B1 | * | 7/2006 | Pritchett ........................ 361/796 |
| 7,215,535 | B2 | * | 5/2007 | Pereira .......................... 361/624 |
| 7,567,434 | B1 | * | 7/2009 | Sivertsen ................. 361/679.32 |
| 7,791,889 | B2 | | 9/2010 | Belady et al. |
| 2004/0017114 | A1 | | 1/2004 | Tseng et al. |
| 2005/0207133 | A1 | | 9/2005 | Pavier et al. |
| 2007/0028126 | A1 | | 2/2007 | Wu et al. |
| 2009/0009007 | A1 | | 1/2009 | Kato et al. |
| 2011/0197005 | A1 | * | 8/2011 | Liao et al. ..................... 710/301 |
| 2011/0254414 | A1 | * | 10/2011 | Li et al. ...................... 312/223.2 |
| 2011/0317342 | A1 | * | 12/2011 | Li ............................ 361/679.01 |

OTHER PUBLICATIONS

International Search Report and Written Opinion from PCT/US2011/037158, mailed Oct. 18, 2011, Amazon Technologies, Inc., 12 pages.
A. Pratt, "DC Voltage Level Overview," Jul. 12, 2007, XP002657942, pp. 1-10.
E.C.W. de Jong, P.T.M. Vaessen, "DC Power Distribution for Server Farms," Sep. 30, 2007, XP002657943, pp. 1-14.

* cited by examiner

*Primary Examiner* — Hung S Bui
(74) *Attorney, Agent, or Firm* — Robert C. Kowert; Meyertons, Hood, Kivlin, Kowert & Goetzel, P.C.

(57) ABSTRACT

A power routing device includes one or more mounting portions and one or more power routing portions. At least one of the mounting portions can be mounted in an expansion slot of a circuit board assembly. The power routing portion can route electrical power to the circuit board assembly. In one embodiment, the expansion slot is a slot for a PCI expansion card.

32 Claims, 6 Drawing Sheets

POWER ROUTING DEVICE FOR EXPANSION SLOT OF COMPUTER SYSTEM

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carried out an organization's operations. Typically, a computer room of a computing facility includes many server racks. Each server rack, in turn, includes many servers and associated computer equipment.

In many rack-mounted servers, circuit boards for the servers are housed in a rack-mounted chassis. Typically, the chassis houses a motherboard assembly, additional circuit boards, such as memory modules, coupled to the motherboard assembly, and a power supply for the electrical component in the chassis. The chassis may also house hard disk drives, fans, or other components.

Having a dedicated power supply in the chassis of a server may take a substantial amount of space in a chassis and produce a significant amount of waste heat in a system. In addition, such power supplies may be relatively inefficient components of the system. Among other things, having a dedicated power supply for each individual server in a rack system is likely to result in excess capacity relative to the load for the system. For example, in a server rack system having 40 servers, each server may include a standard, off-the-shelf power supply with a 350 watt capacity, for a total capacity of 14,000 watts. The maximum load of each server may, however, be only about 250 watts, for a total power requirement of about 10,000 watts.

Some systems are known in which a single power supply provides power to more than one server in a rack. Using such common power supplies may, however, require that the servers be modified to receive power from a power source external to the chassis of the servers, instead of from a conventional power supply inside the chassis. Such modifications to the servers to accommodate a common power supply add cost and complexity to a computing system.

Figure 1:
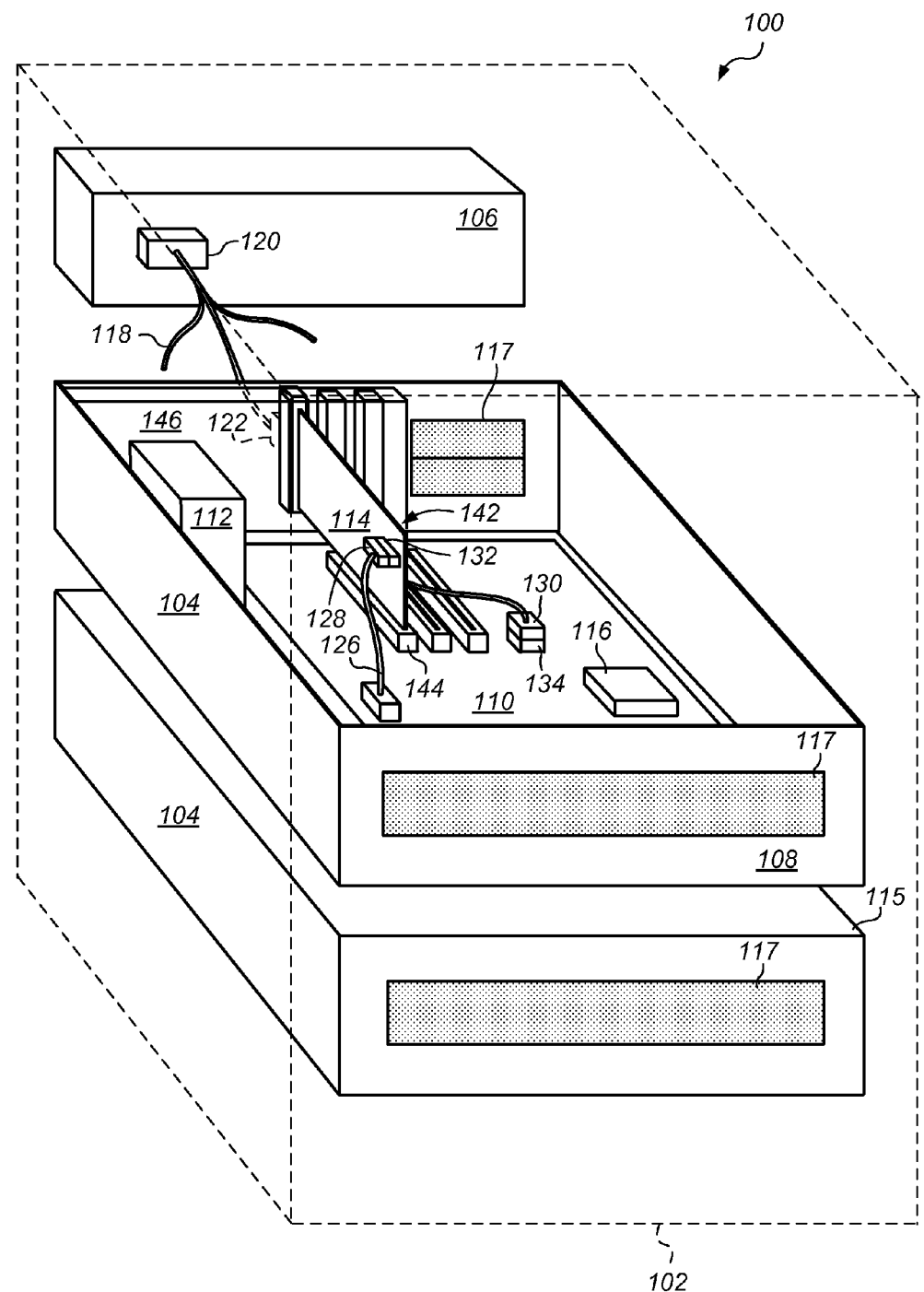
FIG. 1 illustrates a computer system that receives power through a power routing device in an expansion slot of the computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of power routing device for a computer system, and systems and method using such a device, are disclosed.

According to one embodiment, a power routing device includes one or more mounting portions and one or more power routing portions. At least one of the mounting portions can be mounted in an expansion slot of a circuit board assembly. The power routing portion can route electrical power to the circuit board assembly. In one embodiment, the expansion slot is a slot for a PCI expansion card.

According to one embodiment, a computer system includes a circuit board assembly comprising one or more expansion slots and a power routing device in at least one of the expansion slots. The power routing device routes electrical power to electrical components on the circuit board assembly. In some embodiments, the computer system is an off-the-shelf server having at least one PCI expansion slot and a chassis window corresponding to the PCI expansion slot. The power routing device is mounted in the PCI expansion slot.

According to one embodiment, a system includes one or more computer systems and one or more power supplies external to the computer systems. At least one of the computer systems includes a chassis, a circuit board assembly having one or more expansion slots, and a power routing device in at least one of the expansion slots. The power routing device routes electrical power from one of the external power supplies to electrical components on the circuit board assembly.

According to one embodiment, a method of routing power to components in a server includes routing power through an opening in a chassis. The opening corresponds to at least one expansion slot for the server. In one embodiment, the expansion slot is a slot for a PCI expansion card.

As used herein, "expansion card" means card that can be inserted into a circuit board assembly of a computer system to add functions or enhance the capability of the computer system.

As used herein, "expansion slot" means a slot or socket in a computer system that can accept an expansion card.

As used herein, to "route" means to establish or provide a path for.

As used herein, "power routing" means routing one or more electrical conductors that can transmit electrical power from one location to another. Suitable conductors in a power routing device may include wires, bus bars, or circuit board traces. In some embodiments, conductors are carried in insulators and/or protective elements, such as cable insulation, conduits, sheaths, or tubes. In some embodiments, a power routing device may include a power transformer, a power converter, or a power conditioning device.

As used herein, "mounting portion" includes a portion of an element that mounts or couples to another element. A mounting portion may be integrally produced with other portions of an element (such as the bottom edge of a circuit board), or it may be a separate part (such as a bracket).

As used herein, "circuit board" includes a board or card that carries one or more circuits or portions thereof. A circuit board may include, for example, a printed circuit board made of epoxy-glass and metal layers. As used herein, "circuit board assembly" includes any combination of elements that includes one or more circuit boards.

As used herein, "chassis" means a structure or element that supports another element or to which other elements can be mounted. A chassis may have any shape or construction, including a frame, a sheet, a plate, a box, a channel, or a combination thereof. In some embodiments, a chassis may include a card cage. The card cage may be integrated into the main structure of a chassis, or one or more separate parts that are coupled to other portions of a chassis.

As used herein, a "rack" means a rack, container, frame, or other element or combination of elements that can contain or physically support one or more computer systems.

As used herein, "computing" includes any operations that can be performed by a computer, such as computation, data storage, data retrieval, or communications.

As used herein, "computer room" means a room of a building in which computer systems, such as rack-mounted servers, are operated.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, testing, simulations, power distribution and control, and operational control.

In some embodiments, a computer system, such as a server, includes a power routing device that routes electrical power from outside a chassis of the computer system to electrical components of the computer system. The server may be operated, for example, to perform computing operations at a data center. FIG. 1 illustrates an embodiment of a computer system including a motherboard assembly and a power routing device. System 100 includes rack 102, computer systems 104, and power supply 106. Computer systems 104 and power supply 106 may be mounted in rack 102.

Computer systems 104 include chassis 108, motherboard assembly 110, hard disk drive 112, and power routing device 114. Chassis 108 may include a top cover 115 and air vents 117 (for illustrative purposes, top cover 115 is not shown on the upper computer system 104 in FIG. 1).

Motherboard assembly 110 includes central processing unit 116. Motherboard assembly 110 may also include various other electrical components, such as semiconductor devices, memory modules (such as DIMMs), or fans, to perform various functions in computer system 104. Motherboard assembly 110 is coupled to, and supported by, chassis 108. Hard disk drive 112 is mounted in chassis 108.

Power routing device 114 may route power from power supply 106 to electrical components in computer system 104. Cable assembly 118 may couple power supply 106 with computer systems 104. Cable assembly 118 includes connector plug 120 and connector plug 122. Connector plug 122 couples cable assembly 118 to a receptacle on power supply 106. Connector plug 124 couples cable assembly 118 to a receptacle on power routing device 114.

Cable assembly 126 couples power routing devices 114 to motherboard assembly 110 of computer systems 104. Cable assembly 126 includes connector plug 128 and connector plugs 130. Connector plug 128 may couple with mating connector receptacle 132 on power routing device 114. Connector plugs 130 may couple with mating connector receptacles 134 on motherboard assembly 110. In some embodiments, mating connector receptacle 134 on motherboard assembly 110 is a power connector for a standard power supply that is in accordance with an industry standard, such as ATX. In such embodiments, a power routing device may be used to supply power to an off-the-shelf motherboard (which may be designed to receive standard power from a conventional power supply, for example, in the chassis of a server) without any modifications to the motherboard.

Power routing device 114 may route power to various components in computer system 104, such as central processing unit 116 on motherboard assembly 110.

In some embodiments, a power routing device is installed in an expansion slot of a circuit board assembly in a computer system. In certain embodiments, the expansion slot for a power routing device is in accordance with an industry standard. In one embodiment, a power routing device is installed in an expansion slot that meets a peripheral component interconnect ("PCI") standard. Examples of standards for a power routing device (such as a physical form factor for the power routing device) include conventional PCI, full-size PCI, low-profile PCI, and mini PCI. As illustrated in FIG. 1, for example, power routing device 114 couples in expansion slot 142 on motherboard assembly 110. Expansion slot 142 may be in accordance with the PCI standard. Expansion slot 142 includes edge connector socket 144. Chassis 108 includes card cage 146. Power routing device 114 couples with card cage 146 at the rear of chassis 108.

Providing a power routing device in an expansion slot of a motherboard assembly in server may eliminate a need to modify the motherboard assembly or a chassis of a computer system to receive power from an external power supply. In some embodiments, a server receiving power from an external supply includes a chassis and motherboard assembly that are standard for a particular server model. In certain embodiments, a power supply that is normally provided in a server may be removed or omitted from the server.

Computer system 104 may be rack-mountable. For example, rails on the left and right sides of chassis 108 may engage on corresponding rails, slides, or ledges, on left and right sides of a rack. In certain embodiments, a rail kit may be installed on the sides of a chassis.

Vents 117 may allow air to flow through chassis 108 to cool heat producing components of computer systems 104. In some embodiments, a cooling air system for the rack may pass air through computer systems 104. In one embodiment, air flows from the front to the back of computer systems 104.

Figure 2:
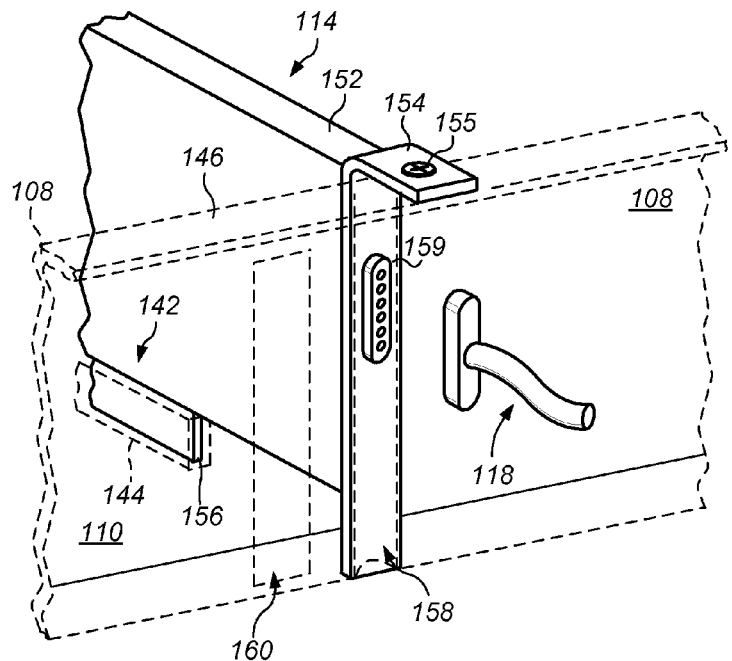
FIG. 2 illustrates a rear perspective view of a power routing device according to one embodiment.

FIG. 2 illustrates a perspective view of a power routing device, as viewed from the rear of chassis of a computer system, according to one embodiment. Power routing device 114 couples in chassis 108. Power routing device 114 includes body 152, backplate 154, and bottom edge 156. Bottom edge 156 of power routing device 114 couples in edge connector socket 144 on motherboard assembly 110. Backplate 154 of power routing device 114 may couple on card cage 146 of chassis 108. Fastener 155 may secure backplate 154 to chassis 108. Backplate 154 may align with window 158 in chassis 108. Window 158 in chassis 108 may correspond to expansion slot 142 in motherboard assembly 110.

Power routing device 114 includes faceplate receptacle 159. Faceplate receptacle 159 may couple with connector plug 122 of cable assembly 118. Cable assembly 118 may include conductors that supply power to power routing device 114 (for example, from power supply 106 described above relative to FIG. 1).

Chassis 108 may include windows 158 and 160. Windows 158 and 160 may each correspond to an expansion slot on motherboard assembly 110. A power routing device that routes power through a chassis window for an expansion slot may eliminate the need to modify a chassis to receive power from a source external to the chassis (instead of, for example, a conventional power supply unit inside the chassis). In some embodiments, some or all of windows for slots that do not have an expansion card installed, such as window 160, may be supplied with blanking plates, for example, to control electromagnetic interference ("EMI") in computer system 104.

Although in the embodiments shown in FIGS. 1 and 2, the power routing device is coupled in an expansion slot directly on the motherboard, in other embodiments, a power routing device may be provided in an expansion slot on another circuit board in a computer system. For example, the power routing device may be coupled to edge socket connector on a mezzanine circuit card. In certain embodiments, a socket connector for a power routing device may be provided on a circuit board that is mounted perpendicular to a motherboard, such that the power routing device is installed parallel to the motherboard.

Although in the embodiments shown in FIGS. 1 and 2, the power routing device 114 routes power through the rear of chassis 108, a power routing device may route power through any part of a chassis, including, front, side, top, bottom, or a combination thereof.

In the embodiments shown in FIG. 1, power routing device 114 delivers power to a single circuit board assembly, namely motherboard assembly 110. In various other embodiments, however, a power routing device may deliver power to two or more circuit boards or other electrical components. In certain embodiments, one computer system may include more than one power routing device.

Figure 3:
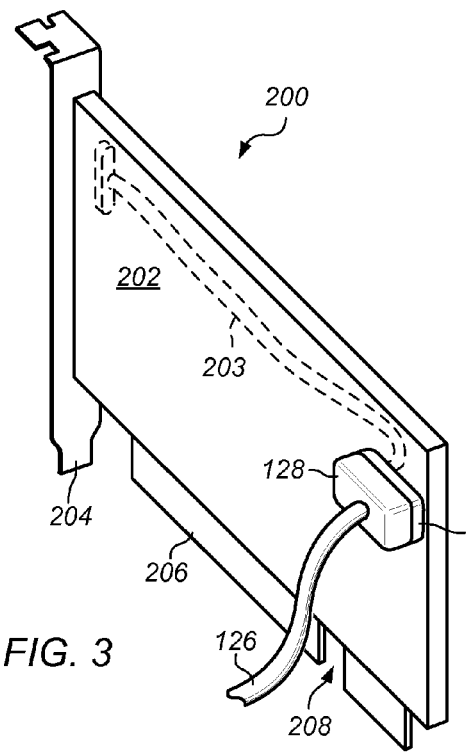
FIG. 3 illustrates one embodiment of a power routing device including a mounting edge with no electrical connections.

In some embodiments, a mounting edge of the power routing device does not include any electrical connections at the mounting edge of the power routing device. FIG. 3 illustrates one embodiment of a power routing device including a mounting edge with no electrical connections. In this embodiment, the mounting edge may be coupled to a standard connector slot on a motherboard assembly, but the electrical contacts in the slot connector are inactive. The edge connector socket for the expansion slot thus provides a mechanical connection to the computer system, but does not provide an electrical connection. In FIG. 3, power routing device 200 includes body 202, conductors 203, backplate 204, and bottom edge 206. Bottom edge 206 may include notch 208.

Body 202 of power routing device 200 can have various forms. In some embodiments, body 202 is, or includes, a circuit board. Body 202 may support cabling on one side or both sides of the body to carry conductors 203. In certain embodiments, power routing device 200 includes a housing for some or all of conductors 203 of power routing device 200. In certain embodiments, body 202 may include a housing that at least partially shields conductors in power routing device 200.

Conductors 203 may carry power received from outside a computer system to one or more circuit boards of a computer system. Conductors 203 may be wires, circuit board traces, bus bars, or any combination thereof. In some embodiments, power routing device 200 feeds conductors directly to a cable, such as cable 126 shown in FIG. 1. For example, power routing device 200 may feed +12 volts direct current from faceplate receptacle 159 to output receptacle 132. In other embodiments, power routing device 206 may convert power received through the input to various voltages. In some embodiments, power routing device 200 may receive signals or data through an input external to a computer system.

In certain embodiments, connectors, such as faceplate receptacle 159 and output receptacle 132, may be omitted from a power routing device. For example, a power routing device may have a "pigtail" arrangement on the input side, the output side, or both. In one embodiment, a power routing device includes a cable that couples to a receptacle on a circuit board assembly.

Figure 4:
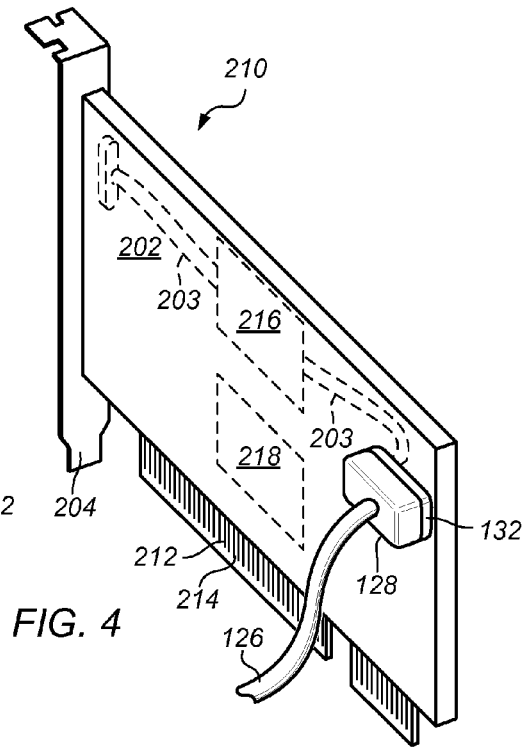
FIG. 4 illustrates one embodiment of a power routing device including a mounting edge with electrical contacts.

In some embodiments, a mounting edge of the power routing device provides electrical connections between a power routing device and a circuit board. FIG. 4 illustrates one embodiment of a power routing device including a mounting edge with electrical contacts. Power routing device 210 includes body 202, backplate 204, and bottom edge 212. Bottom edge 212 includes contacts 214. Contacts 212 may be connected to electrical conductors, such as wires or circuit board traces, in power routing device 210. In certain embodiments, connections through bottom edge 212 are in accordance with a standard for a PCI bus. When bottom edge 212 is installed in an edge connector socket on a circuit board (such as edge connector socket 144 of motherboard 110 shown in FIGS. 1 and 2), contacts 214 on bottom edge 212 may couple with mating contacts on the edge connector socket.

Figure 5:
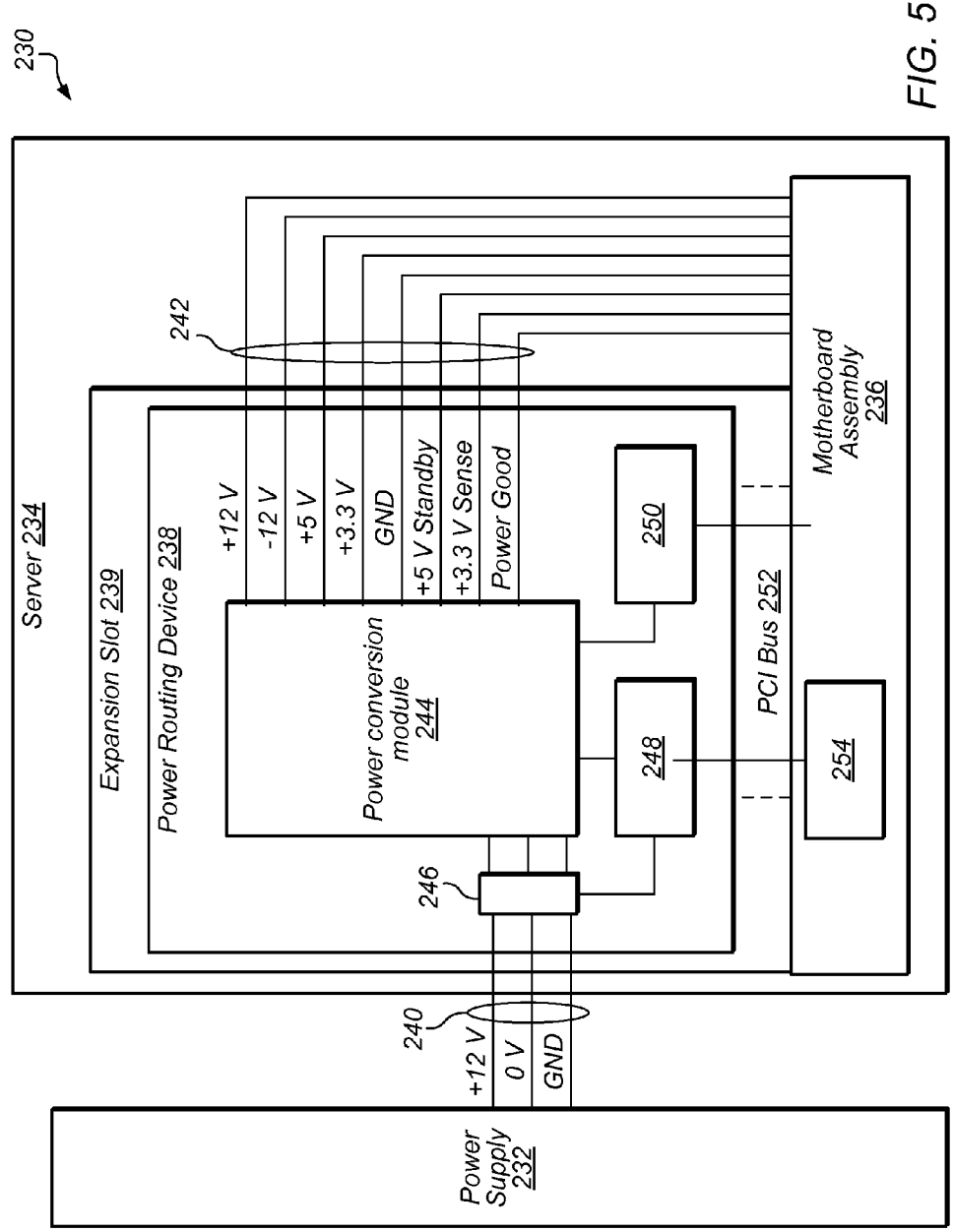
FIG. 5 is a schematic diagram illustrating one embodiment of a system including a power routing device in an expansion slot of a server.

In some embodiments, a power routing device may convert power from one form to another. FIG. 5 is a schematic diagram illustrating one embodiment of a system having a power routing device that provides power conversion. System 230 includes power supply 232 and server 234. Power supply 232 may be external to a chassis for server 234. Server 234 includes motherboard assembly 236 and power routing device 238. Power routing device 238 may couple in expansion slot 239 on motherboard 236. Power routing device 238 may receive input 240 from power supply 232. In the embodiment shown in FIG. 5, input 240 includes +12 volts, 0 volts, and ground. In certain embodiments, power routing device 238 may receive input signals or data, either from power supply 232 or another device. Input 240 may be received in power conversion module 244. Power conversion module may transform, convert, and/or condition input 240 to outputs 242.

Power routing device 238 includes overload protection 246. Overload protection device 246 may include, for example, one or more circuit breakers or fuses.

In some embodiments, a power routing device may provide power management for power routed through the device. For example, power routing device 238 shown in FIG. 5 includes power management module 248. Power management module 248 may be included on a printed circuit board of power routing device 238. Power management device 248 may monitor and control power received as input 240 and/or supplied as output 242.

In some embodiments, power control and/or monitoring functions may be provided on a circuit board that is external to a power routing device. For example, motherboard assembly 236 includes motherboard power management module 254. Motherboard power management module 254 may perform power control and monitoring functions in instead of, or in addition to, power management module 248 on power routing device 238. Motherboard power management module 254 may be coupled to power routing device 238 through PCI bus 252, or through another connection.

In some embodiments, a power routing device may include functions unrelated to power, such as network interface control. In certain embodiments, a power routing device includes server monitoring and control. For example, power routing device 238 shown in FIG. 5 includes baseboard management controller 250. Baseboard management controller 250 may include a microprocessor. Baseboard management controller 250 may monitor various functions on server 234. In certain embodiments, baseboard management controller 250 receives data from sensors in server 234. Baseboard management controller may detect and respond to failures in server 234. Non-power related functions on a power routing device may interact with power-related functions on the power routing device (such as power conversion), or non-power related functions may be independent of power-related functions on the power routing device.

In the embodiment shown in FIG. 5, baseboard management controller 250 communicates with motherboard assembly 236 through PCI bus 252. A baseboard management may be connected to a circuit board assembly in other manners, however, such as through a dedicated cable.

In FIG. 5, for the sake of clarity, only one line is shown for each voltage level and function (+12 volts, ground, power good, etc.) for input 240 and output 242. Input and output lines of a power routing device may, however, include more than one line for a given voltage level or function. For example, consistent with a conventional ATX standard, output 242 may include multiple +12 volt lines, multiple +5.5 lines, multiple ground lines, etc. As another example, input 240 may include multiple +12 volt lines, multiple 0 volt lines, etc.

In some embodiments, output from a power routing device may conform to an industry standard. In one embodiment, the voltages and functions conform to an ATX standard. In various other embodiments, the output from a power routing device may conform to other standards, such as Entry-Level Power Supply Specification, or EPS12V.

As noted above, in certain embodiments, a power routing device may pass through the power it receives. In certain embodiments, a power routing device may receive power that conforms to an industry standard, such as ATX, and route the standard power to one or more circuit boards in a computer system.

Figure 6:
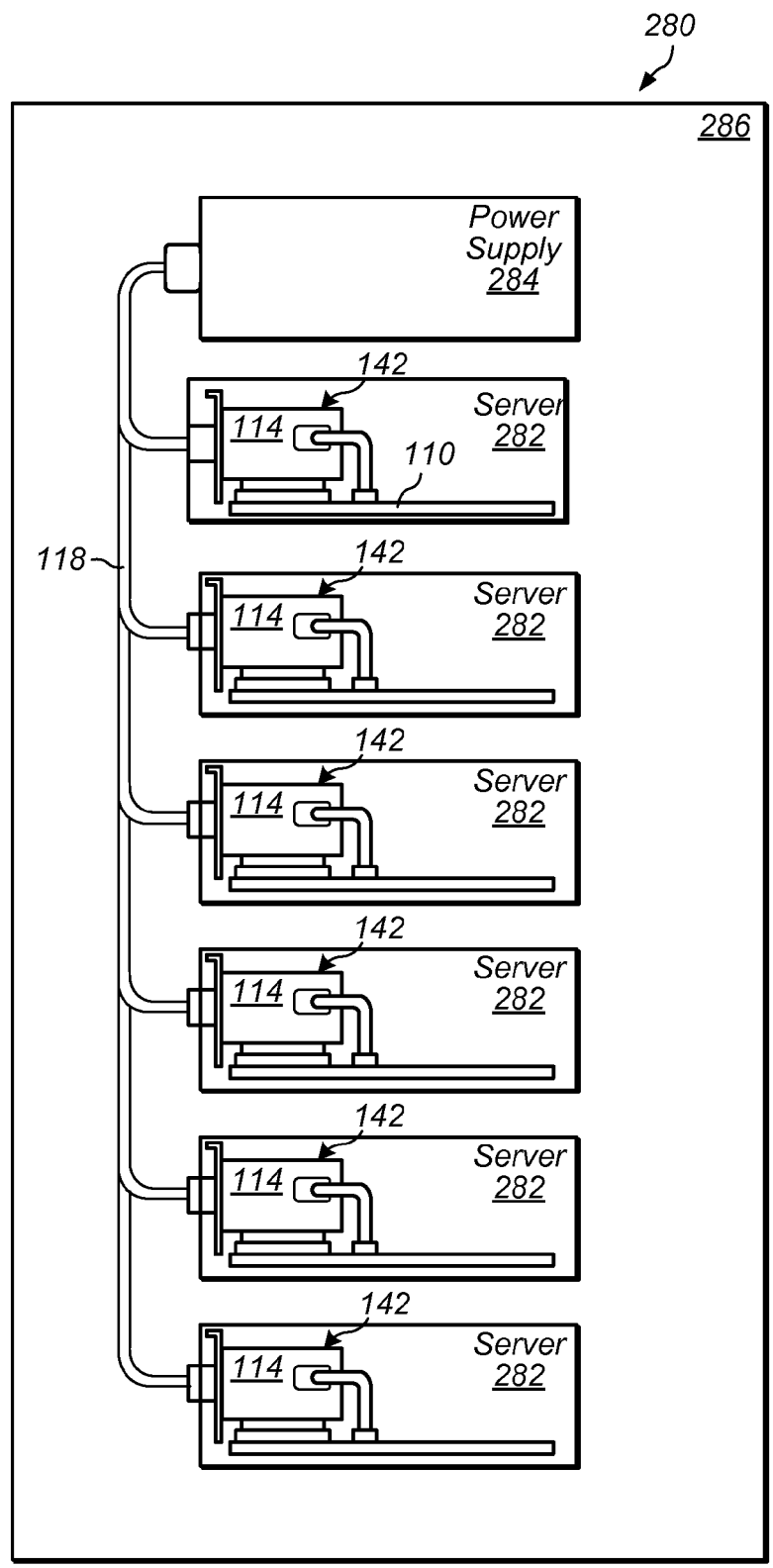
FIG. 6 is a schematic diagram illustrating one embodiment of a system having multiple servers that receive power from a common power supply through power routing devices.

In some embodiments, a common power supply provides power to multiple computer systems in a data center through power routing devices in the computer systems. FIG. 6 is a schematic diagram illustrating a system having multiple servers that receive power from a common power supply through power routing devices in expansion slots of the servers. System 280 includes servers 282 and power supply 284. Servers 282 and power supply 284 may be mounted in rack system 286. Power routing devices 114 are provided in expansion slots 142 in each of servers 282. Cable assembly 118 couples power supply 284 with power routing devices 114 in each of servers 282. Power routing devices 114 may route power to motherboard assemblies 110 in servers 282.

Figure 7:
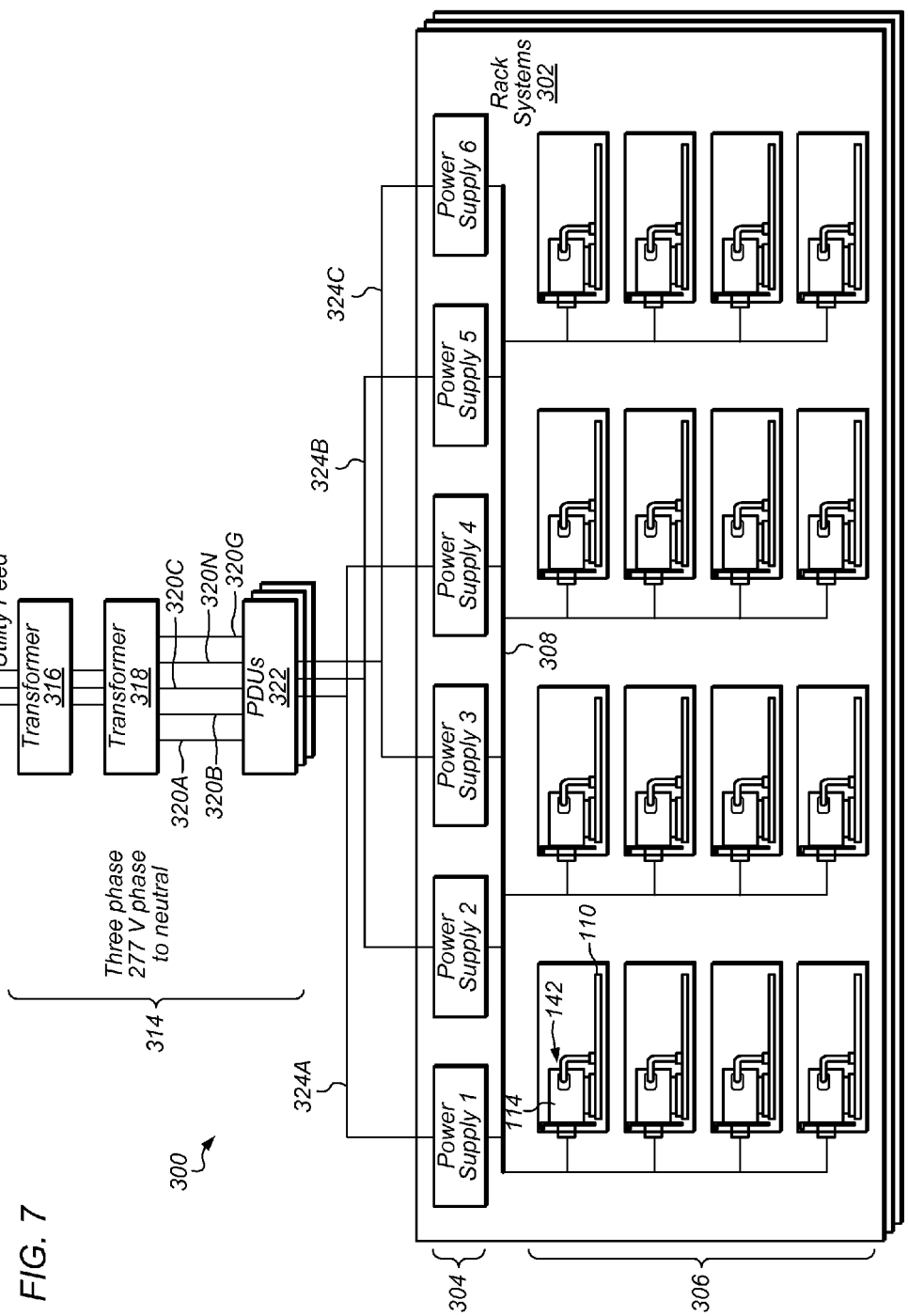
FIG. 7 is a block diagram illustrating one embodiment of a system that includes servers that share power from multiple power supplies.

In some embodiments, servers in a data center share power from multiple power supplies. FIG. 7 is a block diagram illustrating one embodiment of rack system in a data center having servers that share power from multiple power supplies. Data center 300 includes rack systems 302. Rack system 302 includes power supplies 304 and servers 306. Power supplies 304 supply power to servers 306 over power bus 308. Each of servers 306 includes power routing device 114. Power routing device 114 may route power into a chassis of server 306 at expansion slot 142 in server 306, and to one or more circuit board assemblies in server 306.

Data center 300 includes power distribution system 314. Power distribution system 314 may distribute power to power supplies 304 in rack systems 302. Power distribution system 314 includes first stage transformer 316, second stage transformer 318, and power distribution units 322. In one embodiment, transformer 316 is coupled to a utility feed. The utility feed may be a medium voltage feed. In certain embodiments, the utility feed is at a voltage of about 13.5 kilovolts or 12.8 kilovolts at a frequency of about 60 Hz.

In one embodiment, first stage transformer 316 steps down voltages from the three-phase utility feed to intermediate power at intermediate line-to-line voltages of about 480 V. In some embodiments, first stage transformer 316 may be implemented as a series of two or more transformers that step down the voltage incrementally. For example, one transformer may step down a feed voltage at 60+ kilovolts to a voltage between 5 kilovolts and 10 kilovolts. A second transformer may further step down from line-to-line voltages of between 5 kilovolts and 10 kilovolts to line-to-line voltages at about 480 volts.

Second stage transformer 318 may transform three-phase intermediate power from first stage transformer 316 to operating power (e.g. "floor" power). The operating power may be at a line-to-line voltage of about 480 volts and a phase-to-neutral voltage of about 277 volts. Transformer 318 may be a wye transformer. In one embodiment, transformer 318 has primary windings in a delta configuration and secondary windings in a wye configuration.

The voltages described herein may be within typical manufacturing tolerances for transformers in power distribution applications and may be dependent on the particular transformer winding configuration and materials. In one embodiment, phase-to-neutral voltages of the operating power lines may be within a range of about +/−10 volts.

The output power from transformer 318 is transmitted via one or more sets of phase lines 320A, 320B, and 320C, and neutral line 320N to one or more power distribution units 322. In one embodiment, each of phase lines 320A, 320B, and 320C may carry up to about 42 amps. In an embodiment, the total output for each power distribution unit 322 may be about 20 kVA. Second stage transformer 318 also includes ground line 320G. Computer system components may also be grounded to the floor structure of the computer room (either by conductors or through the structure of the rack in which they are enclosed). In certain embodiments, ground line 320G is omitted.

Power distribution units 322 are coupled to power supplies 304 in rack system 302. Various of servers 306 in a system may operate on different phases of power distribution system 314. For example, in the embodiment shown in FIG. 7, power supplies 1 and 4 are coupled on line 324A, power supplies 2 and 5 are coupled on line 324B, and power supplies 3 and 6 are coupled on line 324C. Each of lines 324A, 324B, and 324C may correspond with one of the three-phase output lines 320A, 320B, and 320C from second stage transformer 318, in each case, paired with neutral 320N. In FIG. 7, power bus 308 and the distribution lines to servers 306 are represented as single lines for clarity. Power bus 308 and the distribution lines to servers 306 may, however, include any number of conductors, for example, such that the lines for different phases of power from second stage transformer 318 are isolated from one another.

In some embodiments, power supplies 304 are configured to receive power at variable input voltages. In one embodiment, power supplies 304 can accept input voltages up to about 277 V. In certain embodiments, transformers for a power distribution system are selected such that operating power to variable server power supplies is near the maximum input voltage specification for the server power supplies. In one embodiment, a transformer transforms three-phase source power to three-phase operating power at a phase-to-neutral operating voltage on each leg of at least about 260 volts. The power distribution unit supplies operating power from the transformer to the power supplies for the computer systems. In one embodiment, the three-phase operating power has a phase-to-neutral voltage of about 277 volts.

Figure 7A:
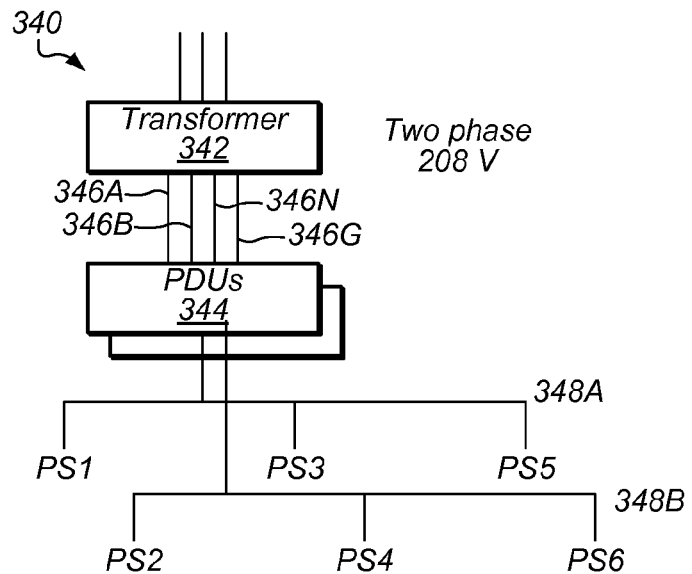
FIG. 7A illustrates one embodiment of an alternative power distribution system for providing power to power supplies in a data center.

In some embodiments, power supplies 304 can accept power at either of two or more different input voltages and/or phases, and supply power output to servers 306. For example, power supplies 304 may be able to alternately accept input power at 277 volts or at 208 volts. FIG. 7A illustrates one embodiment of an alternate power distribution system that can provide power to power supplies 304 at 208 volts. Power distribution system 340 includes transformer 342 and power distribution units 344. Transformer 342 may receive power from a utility feed or from a step-down transformer upstream from transformer 342 similar to first stage transformer 316 described above with relative to FIG. 7. Two-phase output power from transformer 342 at 208 volts is transmitted via one or more sets of phase lines 346A, 346B, and neutral line 346N to one or more power distribution units 344. Transformer 342 also includes ground line 346G. Power from line 346A may be transmitted from power distribution units 344 to power supplies 1, 3, and 5 over lines 348A. Power from line 346B may be transmitted from power distribution units 344 to power supplies 2, 4, and 6 over lines 348B.

In another embodiment, a power distribution system may include a transformer that transforms power to a power output of 480/360-208 volts, three-phase power. The power distribution unit may supply 208 volt power to power supplies 304 in data center 300.

In the data embodiment shown in FIG. 7, rack system 300 includes six power supplies 304 and sixteen servers 302. A rack system may, in various other embodiments, include any number of power supplies and servers.

Figure 8:
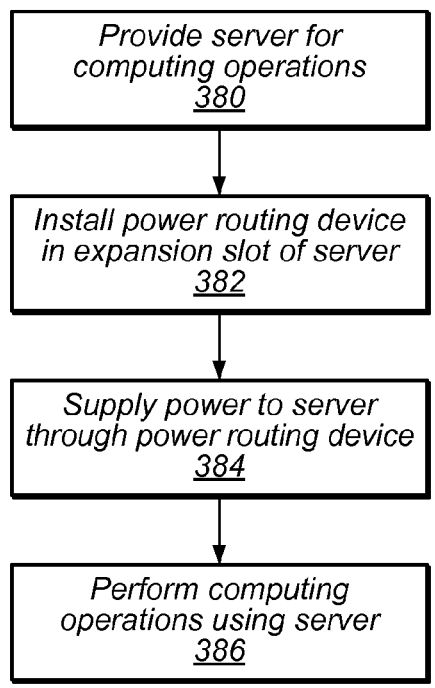
FIG. 8 illustrates a method of delivering power to a computer system that includes routing power through a chassis window that corresponds to an expansion slot in the computer system, according to one embodiment.

FIG. 8 illustrates one embodiment of a method of delivering power to electrical components in a computer system that includes routing power through a window in a chassis corresponding to an expansion slot. At 380, a server is provided for use in computing operations. In some embodiments, the server may be an off-the-shelf server. For example, the server may have a standard, off-the-shelf motherboard. The server may be mounted in a standard, off-the-shelf chassis.

At 382, a power routing device is installed in at least one expansion slot in a server. The expansion slot may be in accordance with an industry standard. In one embodiment, the expansion slot has a form factor for a PCI slot. In certain embodiments, installing the power routing device includes coupling an output cable from the power routing device to a standard power socket connector on a motherboard of the server. In some embodiments, the server may be an off-the-shelf server that accommodates a standard power supply in the chassis of the server, such as an ATX power supply. In certain embodiments, a standard, on-board power supply may be removed from the server before the server is placed into operation (since the standard, on-board power supply is not intended to be used).

At 384, power is supplied to the server through the power routing device in the expansion slot of the server. The power may be supplied, for example, from a power supply unit that is external to the server. In certain embodiments, the power supply may provide power to two or more servers in a data center. In one embodiment, power supplies receive power from a power distribution system such as described above relative to FIGS. 7 and 7A. At 386, computing operations are performed using the server.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A power routing device, comprising:
one or more mounting portions coupled in an expansion slot of a motherboard assembly; and
a power routing portion held in the expansion slot of the motherboard assembly on the one or more mounting portions, wherein the power routing portion is configured to route electrical power from one or more power sources external to the motherboard assembly to electrical components on the motherboard assembly.

2. The power routing device of claim 1, wherein the expansion slot is in accordance with at least one input/output (I/O) standard.

3. The power routing device of claim 1, wherein the expansion slot is a Peripheral Component Interconnect (PCI) expansion slot.

4. The power routing device of claim 3, wherein the power routing device has a form factor within a standard for a PCI expansion card.

5. The power routing device of claim 1, wherein at least one of the mounting portions comprises an edge configured to couple in a connector socket for the expansion slot on the motherboard assembly.

6. The power routing device of claim 1, wherein at least one of the mounting portions is configured to couple in a chassis window corresponding to the expansion slot.

7. The power routing device of claim 1, wherein the power routing portion is configured to transmit power through a chassis window corresponding to the expansion slot to electrical components on the motherboard assembly.

8. The power routing device of claim 1, wherein the power routing portion comprises a connector portion configured to couple with at least one input power cable.

9. The power routing device of claim 1, wherein the power routing portion comprises at least one cable configured to couple with at least one connector receptacle on the motherboard assembly and to transmit power to electrical components on the motherboard assembly.

10. The power routing device of claim 1, wherein the power routing portion is configured to transform at least one input to the power routing portion from a first voltage to a second voltage.

11. The power routing device of claim 1, wherein the power routing portion is configured to convert input power to output power that conforms to at least one industry standard.

12. The power routing device of claim 1, wherein the power routing device is configured to control or monitor at least one function of electrical power transmitted through the power routing device.

13. The power routing device of claim 1, wherein the motherboard assembly is configured to control or monitor power transmitted through the power routing device.

14. The power routing device of claim 1, further comprising one or more routing device circuit modules, wherein at least one of the routing device circuit modules is coupled to the motherboard assembly through an edge connector coupled in a connector socket on the motherboard assembly.

15. The power routing device of claim 1, further comprising further comprising one or more routing device circuit modules electrically coupled to the motherboard assembly, wherein at least one of the one or more routing device circuit modules is configured to perform at least one function not related to electrical power.

16. A computer system, comprising:
a motherboard assembly comprising one or more expansion slots; and
a power routing device coupled in at least one of the expansion slots of the motherboard assembly, wherein the power routing device is configured to route electrical power from one or more power sources external to the motherboard assembly to electrical components on the circuit board assembly.

17. The computer system of claim 16, wherein the at least one expansion slot is a PCI expansion slot.

18. The computer system of claim 16, further comprising a chassis, wherein the motherboard assembly is mounted in the chassis, and wherein the power routing device is configured to route electrical power through a window in the chassis corresponding to the at least one expansion slot.

19. The computer system of claim 18, wherein the window comprising an opening for a backplate of a standard PCI card corresponding to at least one expansion slot on the motherboard assembly.

20. The computer system of claim 16, wherein the power routing device is configured to transmit power that conforms to at least one industry standard.

21. The computer system of claim 16, wherein the motherboard assembly comprises a standard power connector portion, and wherein the power routing device is configured to couple with the standard power connector power portion to supply power to electrical components on the computer system.

22. A system, comprising:
one or more computer systems; and
one or more power supplies external to the one or more computer systems,
wherein at least one of the computer systems comprises:
a chassis;
a motherboard assembly comprising one or more expansion slots; and
one or more power routing devices coupled in at least one of the expansion slots and configured to route electrical power from at least one power supply external to the computer system to one or more electrical components on the motherboard assembly.

23. The system of claim 22, wherein the at least one of the expansion slots in which a power routing device is coupled is a PCI expansion slot.

24. The system of claim 22, further comprising a rack, wherein at least one of the computer systems and at least one of the power supplies is mounted in the rack.

25. The system of claim 22, wherein the one or more computer systems comprises two or more computer systems, wherein at least one of the power supplies external to the computer systems supplies power to two or more of the computer systems.

26. The system of claim 22, wherein at least one of the power supplies external to the computer systems is configured to provide power to at least two computer systems.

27. The system of claim 22, wherein at least one of the power supplies is configurable to receive input power at two or more different input voltages and supply output power to at least one of the computer systems.

28. The system of claim 27, wherein at least one of the power supplies is configurable to receive input power at an input voltages of at least about 260 volts.

29. The system of claim 22, wherein the one or more power supplies comprise two or more power supplies, wherein at least one of the computer systems is configured to receive power from at least two of the power supplies.

30. A method of routing power to components in a server, comprising:
routing power through an opening in a chassis to at least one power routing device coupled in at least one expansion slot in the server, wherein the opening corresponds to the at least one expansion slot; and
routing power from the at least one power routing device in the expansion slot to one or more electrical components on one or more motherboard assemblies of the server.

31. The method of claim 30, wherein the at least one expansion slot in the server is a PCI expansion slot.

32. The method of claim 30, wherein routing power from the at least one power routing device to one or more electrical components on the one or more motherboard assemblies comprises coupling at least one cable for the power routing device to at least one circuit board connector portion on at least one of the motherboard assemblies in the server.

* * * * *